US006635103B2

(12) United States Patent
Sirkar et al.

(10) Patent No.: US 6,635,103 B2
(45) Date of Patent: Oct. 21, 2003

(54) MEMBRANE SEPARATION OF CARBON DIOXIDE

(75) Inventors: Kamalesh K. Sirkar, Berkeley Heights, NJ (US); A. Sarma Kovvali, Missouri City, TX (US); Hua Chen, Hamilton (CA)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 10/200,079

(22) Filed: Jul. 19, 2002

(65) Prior Publication Data

US 2003/0033932 A1 Feb. 20, 2003

Related U.S. Application Data

(60) Provisional application No. 60/306,748, filed on Jul. 20, 2001.

(51) Int. Cl.$^7$ .............................................. B01D 53/22
(52) U.S. Cl. ...................... 95/44; 95/51; 96/5; 423/228
(58) Field of Search .............................. 95/44.51; 96/5; 423/226, 228

(56) References Cited

U.S. PATENT DOCUMENTS

| | | | | |
|---|---|---|---|---|
| 3,335,545 A | * | 8/1967 | Robb et al. ..................... | 95/44 |
| 3,371,468 A | * | 3/1968 | Shropshire ....................... | 96/5 |
| 4,115,514 A | * | 9/1978 | Ward, III ..................... | 423/232 |
| 4,119,408 A | * | 10/1978 | Matson ......................... | 422/169 |
| 4,750,918 A | * | 6/1988 | Sirkar ............................ | 95/44 |
| 4,954,145 A | * | 9/1990 | Thakore et al. ................ | 95/44 |
| 4,961,758 A | * | 10/1990 | Dobitz ........................... | 95/44 |
| 5,110,326 A | | 5/1992 | Sirkar et al. | |
| 5,135,547 A | * | 8/1992 | Tsou et al. ...................... | 95/44 |
| 5,281,254 A | * | 1/1994 | Birbara et al. ................. | 95/44 |
| 5,445,669 A | * | 8/1995 | Nakabayashi et al. .......... | 96/5 |
| 5,580,452 A | * | 12/1996 | Lin ........................ | 210/321.74 |
| 5,749,941 A | * | 5/1998 | Jansen et al. ................... | 95/44 |
| 5,876,486 A | * | 3/1999 | Steinwandel et al. .......... | 95/44 |
| 6,086,769 A | | 7/2000 | Kilambi et al. | |
| 6,096,217 A | | 8/2000 | Kilambi et al. | |
| 6,156,096 A | | 12/2000 | Sirkar | |
| 6,165,253 A | * | 12/2000 | Sirkar et al. ..................... | 96/6 |
| 6,228,145 B1 | * | 5/2001 | Falk-Pedersen et al. ....... | 95/44 |
| 6,416,568 B1 | * | 7/2002 | Wallace et al. ................ | 95/55 |
| 6,485,650 B1 | * | 11/2002 | Bhown ........................ | 210/643 |

FOREIGN PATENT DOCUMENTS

EP 0 213 744 3/1987

OTHER PUBLICATIONS

A. Sarma Kovali, et al, Dendrimer Membranes: A $CO_2$ – Selective Molecular Gate, Journal of the American Chemical Society vol. 122:7594–7595, Jul. 20, 2000.

A. Sarma Kovali et al, Dendrimer Liquid Membranes: $CO_2$ Separation from Gas Mixtures, Industrail & Engineering Chemistry Research, vol.40:2502–2511, Apr. 26, 2001.

K.K. Sirkar et al, Dendrimer Liquid Membranes for $CO_2$ Separations, (Invention Disclosure) Center for Membrane Technologies, NJ Institute of Technology, Feb. 14, 2000.

K.K. Sirkar et al, Carbon Dioxide Separation with Novel Solvents as Liquid Membranes, (Invention Disclosure) NJ Institute of Technology, Mar. 2, 2001.

* cited by examiner

Primary Examiner—Robert H. Spitzer
(74) Attorney, Agent, or Firm—Klauber & Jackson

(57) ABSTRACT

A method for the separation of carbon dioxide from a gas mixture is described in which a dendrimer selective for carbon dioxide is present in an immobilized liquid membrane, the dendrimer being either in pure form or optionally with at least one solvent, such as but not limited to glycerol, polyethylene glycol, water, refrigerated methanol, NMP, or glycerol carbonate, the latter also having selective carbon dioxide properties as will be described below. In another embodiment, a dendrimer selective for carbon dioxide and capable of forming a film may be used in the method as the membrane itself, optionally with at least one solvent.

5 Claims, 2 Drawing Sheets

MEMBRANE SEPARATION OF CARBON DIOXIDE

RELATED PATENT APPLICATION

This application claims priority under 35 U.S.C. §119(e) to U.S. Provisional Patent Application No. 60/306,748 filed Jul. 20, 2001, which application is herein incorporated by reference.

FIELD OF THE INVENTION

This invention relates to the separation of carbon dioxide from gas mixtures. More specifically, the invention relates to a method for the separation of carbon dioxide from a gas mixture using an Immobilized Liquid Membrane that contains a dendrimer selective for carbon dioxide.

BACKGROUND OF THE INVENTION

Gas separation using facilitated transport membranes (FTMs) has been the subject of considerable research for many years. Major advantages of FTMs over conventional polymeric membranes include higher fluxes for reacting gas species like carbon dioxide, olefins and the resultant high selectivities over nonreacting species like nitrogen, paraffins etc. This is possible due to the additional mechanism of a reversible chemical reaction of the preferred gaseous species with a reactive carrier present in the FTM in addition to the solution-diffusion mechanism. FTMs are particularly attractive at low reacting species concentrations where the concentration driving force for the solution-diffusion membranes is very low (Meldon, J. H.; Stroeve, P.; Gregoire C. E. Facilitated Transport of Carbon Dioxide: A Review. Chem. Eng. Commun. 1982, 16, 263–300; Ho, W. S.; Dalrymple, D. C. Facilitated Transport of Olefins in Ag+-containing Polymer Membranes. J. Membr. Sci. 1994, 91, 13–25). Facilitated transport membranes include ion-exchange membranes, fixed-site carrier membranes, contained liquid membranes, and immobilized liquid membranes (Way, J. D.; Noble R. D. Facilitated Transport. In Membrane Handbook; Ho W. S. W.; Sirkar K. K. (Eds.) Chapman and Hall, New York, 1992).

Immobilized liquid membranes (ILMs) contain a liquid solution immobilized in the pores of the polymeric or ceramic substrate by physical forces. They are also referred to as supported liquid membranes (SLMs), particularly in the context when feed and sweep sides are liquid streams. The liquid solution consists of a carrier and a solvent. The carrier reacts reversibly with the gas species of interest.

ILMs can potentially provide the highest fluxes and selectivities for reacting species such as carbon dioxide and olefins particularly at low concentrations in gas separation. Despite the obvious advantages offered by the immobilized liquid membranes, commercialization of these membranes has not taken place due to the inherent limitation of stability of the liquid membranes. The main reasons for the instability of the ILMs are due to absence of any chemical bonding of the carrier to the substrate matrix; evaporation of the carrier species and/or the solvent liquid into the gas phases during the operation; and lower breakthrough pressures associated with the liquids.

There are variations to using these liquids for $CO_2$ separation. The $CO_2$ absorption can be performed in one membrane module (with $CO_2$-containing gas flowing on one side, the absorbing liquid flowing on the other side of the membrane), while the absorbing liquid is regenerated in a separate unit called a stripping unit (it can be a membrane-based or a non-membrane based unit). The absorbing liquid can contain a facilitating agent or it can contain liquids having preferential solubility for $CO_2$ over other gases, functioning as a physical solvent. This configuration is usually called absorption-stripping.

Another variation is to incorporate the facilitating agent in a polymeric network and forming a thin membrane on top of a substrate. The facilitating agent can be incorporated into the polymer network as a component of the polymer solution prior to its crosslinking (Ho and Dalrymple,1994, op. cit.; Ho, W. S. W. Membranes may be comprised of salts of amino acids incorporated into hydrophilic polymers. U.S. Pat. No. 5,611,843, Mar. 18, 1997). The facilitating agent can be incorporated into the network after forming the polymer network. (Matsuyama, H.; Teramoto, M. Facilitated Transport of Carbon Dioxide through Functional Membranes Prepared by Plasma Graft Polymerization using Amines as Carrier, in Chemical Separations with Liquid Membranes. Bartsch R. A.; Way J. D. (Eds.) ACS Symp. Series No. 642, p. 252 (1996).

The stability of aqueous-based ILMs is usually improved when the feed and sweep sides are completely humidified, minimizing the loss of solvent (water) due to evaporation (Teramoto, M.; Matsuyama, H.; Yamashiro, T.; Katayama, Y. Separation of Ethylene from Ethane by Supported Liquid Membranes Containing Silver Nitrate as a Carrier. J. Chem. Eng. Japan 1986, 19, 419–424). The long term stability of these membranes has not been established in literature and these membranes can not withstand even temporary oscillations in the humidity conditions on either side of the liquid membranes. A major factor that limited the practical applicability of such an approach is that the sweep side always requires a sweep gas, essentially diluting the permeated gases. This limitation has serious implications in downstream processing of the permeate stream or when highest possible concentrations on the permeate side are required, either for economic or environmental reasons. For example, in the separation of carbon dioxide from gas mixtures for sequestration, the permeate side should be as concentrated as technically possible in carbon dioxide to reduce the gas volumes for further transport and storage.

Another alternative way to improve the ILM stability is to use low-volatile and hygroscopic solvents like polyethylene glycol for preparation of the ILM (Meldon, J. H.; Paboojian, A.; Rajangam, G. Selective $CO_2$ Permeation in Immobilized Liquid Membranes. AIChE Symp. Set. 1986, 248, 114; Davis, R. A.; Sandall, O. C. $CO_2/CH_4$ Separation by Facilitated Transport in Amine-polyethylene Glycol Mixtures. AIChE J. 1993, 39, 1135; Saha, S.; Chakma, A. Selective $CO_2$ Separation from $CO_2/C_2H_6$ Mixtures by Immobilized Diethanolamine/PEG Membranes. J. Membr. Sci. 1995, 98, 157). However, the performance of such a membrane has not been acceptable (Meldon et al., 1986, op. cit.).

It is towards the use of dendrimer-containing immobilized liquid membranes, carriers and solvents therefor in the separation of carbon dioxide from gas mixtures, that the present invention is directed.

The citation of any reference herein should not be deemed as an admission that such reference is available as prior art to the instant invention.

SUMMARY OF THE INVENTION

In accordance with the present invention, a method for the separation of carbon dioxide is described that uses an immobilized liquid membrane containing a dendrimer and, optionally, at least one solvent having carbon dioxide selectivity, such as, but not limited to, glycerol, polyethylene glycol, water, refrigerated methanol, NMP, or glycerol carbonate. Porous ceramic membranes may also be used. Other solvents may be used. In another embodiment, the method involves using a dendrimer selective for carbon dioxide and capable of forming a film as the membrane itself, optionally with at least one solvent.

A preferred dendrimer selective for carbon dioxide is a polyamidoamine dendrimer (PAMAM), but the invention is not so limiting and other dendrimers with carbon dioxide selective properties may be used, such as those with multiple terminal amino groups and those also with amido groups, secondary or tertiary amines, or combinations thereof. In a more preferred embodiment, a generation zero polyamidoamine dendrimer is used. In most preferred embodiments, the aforementioned dendrimer is used with a glycerol solvent or with glycerol carbonate, which acts both as a solvent and as a further selective carbon dioxide carrier.

Any porous membrane may be used as the membrane portion of the immobilized liquid membrane of the invention, such as but not limited to a polypropylene membrane such as CELGARD 2500 or poly(vinylidene fluoride) membranes, and preferably, hydrophilized forms of the aforementioned exemplary membranes may be used. However, the invention is not so limiting to such membranes, and as mentioned above, a polymeric dendrimer comprising carbon dioxide selective groups, e.g. primary amino groups and secondary or tertiary amine groups, or any combination thereof may as a film-forming material itself comprise the membrane or film, optionally with at least one solvent. Other preferred porous membranes that may be used in the invention include polyacrylonitrile, regenerated cellulose, and polysulfone membranes.

The selection of porous membrane for use with the glycerol carbonate carrier is as aforedescribed. Moreover, a carbon dioxide selective dendrimer or polymer with like groups may be used to form the membrane, and glycerol carbonate used as both a carrier and solvent in the selective membrane.

The invention is directed to a method for separating carbon dioxide from a feed gas comprising exposing the feed gas to an aforementioned membrane, wherein carbon dioxide is selectively transferred across the membrane. Thus, the feed gas is desirably reduced in its concentration of carbon dioxide. Such a desirable reduction of carbon dioxide in a gas is useful in a variety of applications, including but not limited to the reuse of air for animal respiration, and improving the combustibility of flammable gases that may undesirably contain carbon dioxide. Any process where reduction or removal of carbon dioxide from a gas mixture may be desired is applicable to the invention herein.

These and other aspects of the present invention will be better appreciated by reference to the attached drawings and Detailed Description.

DETAILED DESCRIPTION OF THE INVENTION

Figure 1:
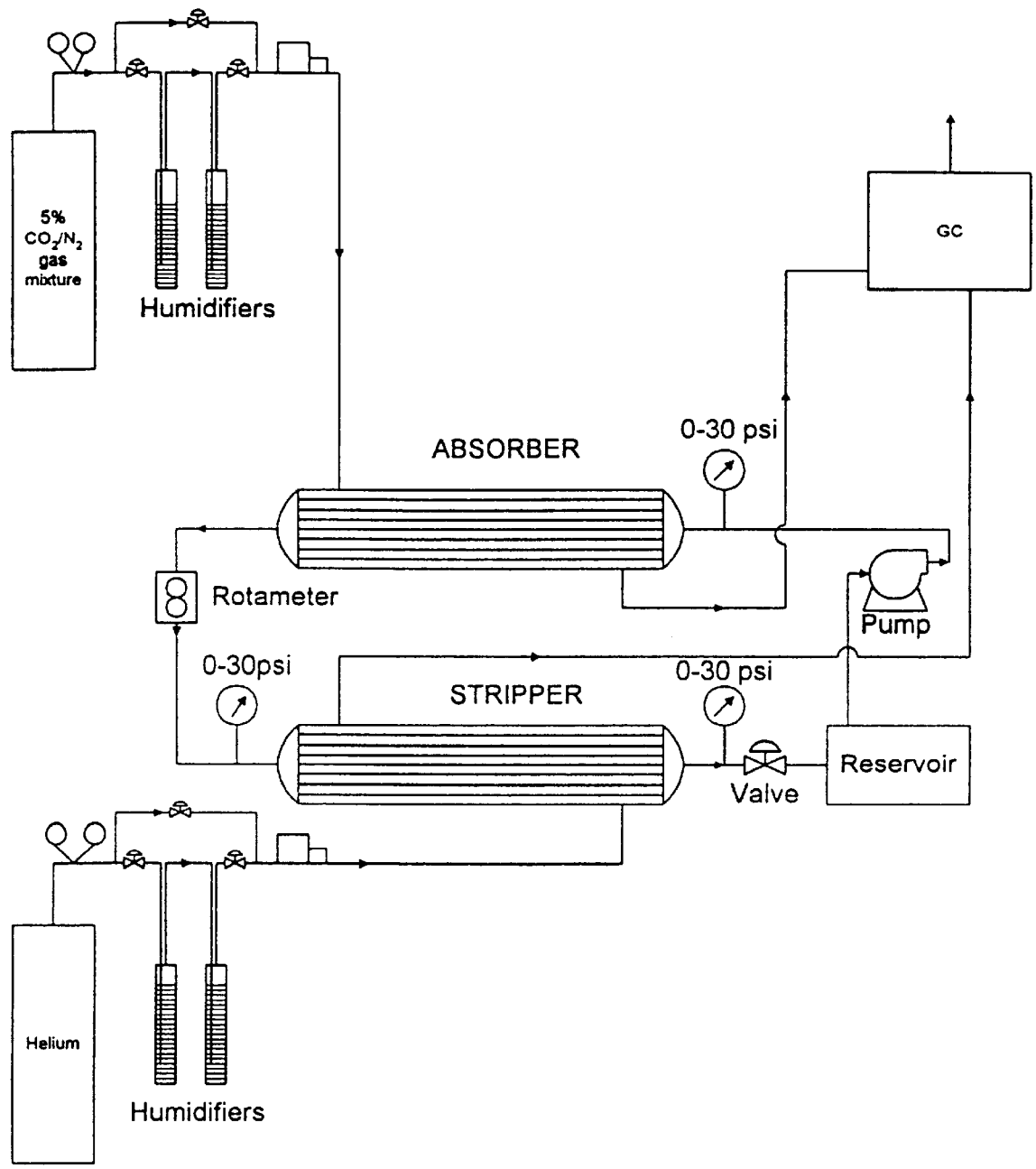
FIG. 1 is an illustration of an experimental apparatus for the separation of $CO_2$ from a gaseous mixture according to the invention.

The present inventors have made improvements in the effectiveness of immobilized liquid membranes (ILMs) for the separation of carbon dioxide using two approaches: selecting a carrier which itself is highly viscous and non-volatile and does not require a solvent, and if water is needed for its chemical reactivity, having the carrier be hygroscopic; and selecting a solvent for the carrier which is viscous and non-volatile and may not require the presence of water for the selectivity. These approaches have been achieved by the use of amine-containing dendrimers as carrier, and glycerol carbonate as carrier or solvent.

Carrier refers to a compound or substance with selectivity for carbon dioxide and can be used in a membrane for selectively facilitating the transfer of carbon dioxide from one side of the membrane to the other.

As will be seen in the examples herein, generation zero polyamidoamine (PAMAM) dendrimer in the immobilized liquid membrane (ILM) configuration was studied using flat films and hollow fibers for $CO_2$—$N_2$ separation. This dendrimer as a pure liquid functions as a $CO_2$-selective molecular gate with highly humidified feed gas. The present work further broadens the range of relative humidity of the feed gas stream ($RH_f$) by adding a small amount of glycerol to the pure dendrimer liquid. A 75% dendrimer-25% glycerol ILM was found to increase the operating range of $RH_f$ substantially while maintaining the $CO_2$ permeance and the selectivity $\alpha_{CO2/N2}$ close to the levels observed with a pure dendrimer ILM. The performances of pure and 75% dendrimer ILMs were found to be superior or comparable to the highest reported $\alpha_{CO2/N2}$s. This behavior is explained in terms of the charged environment in the dendrimer liquid membrane under humidified feed conditions and facilitated transport of $CO_2$.

The present invention focuses on these three approaches towards improving the stability and performance of the ILMs for gas separation for $CO_2$ separation. The first approach of improving the ILM stability by employing a liquid membrane system where a carrier is the only component in the ILM is studied using a new class of hyperbranched polymers called dendrimers. This class of polymers has molecular weights ranging from 518 to several thousands depending on their generation. They also offer the needed properties like non-volatility, good chemical and thermal stability, reversible complexation capability etc. (Tomalia et al., 1990).

Facilitated transport membranes provide very good selectivities and permeances for the reacting species (e.g. $CO_2$, olefins) when they are present in low concentrations in the feed gas mixture. However, their performance at high feed side concentrations of the reacting gases is usually compromised due to carrier saturation. The presence of glycerol in the present ILMs does not prevent this deterioration in performance at higher $CO_2$ concentrations as it is essentially non-selective to carbon dioxide (Chen et al., 1999). There is always a need for better solvents which have selectivities for the gas of choice. Glycerol carbonate is suggested here as a possible $CO_2$-selective physical solvent for carbon dioxide separation.

There are several industrial processes for separating $CO_2$ based on physical/chemical solvents (Kohl and Riesenfeld, 1979). In order for the solvent based process to be practical, the solvents should have higher solubility for $CO_2$ than in water, must have extremely low vapor pressure, low viscosity and low or moderate hygroscopicity. Some of the solvents used are: methanol at low temperatures (Rectisol process), propylene carbonate (Fluor process), N-methyl-2-pyrrolidone (NMP; Purisol process), dimethyl ether of polyethylene glycol (Selexol process), tributylphosphate (Estasolvan process) and mixture of diisopropanolamine, sulfolane and water (Sulfinol process). Most of these solvents have higher solubility for $H_2S$ than for $CO_2$. Another common feature of these processes is that they are used in contactor-stripper mode, requiring two separate steps in $CO_2$ separation.

The following documents are provided which more fully illustrate the preferred embodiments of the invention. They should in no way be construed, however, as limiting the broad scope of the invention. These documents and all citations therein are incorporated herein by reference in their entireties.

1. "Dendrimer membranes: A $CO_2$-selective molecular gate" by A. Sarma Kovvali, Hua Chen and Kamalesh K. Sirkar. Journal of the American Chemical Society 122:7594–7595, 2000.
2. "Dendrimer liquid membranes: $CO_2$ separation from gas mixtures" by A. Sarma Kovvali and Kamalesh K. Sirkar. Industrial and Engineering Chemistry Research 40:2502–2511, 2001.
3. "Dendrimer liquid membranes for $CO_2$ separations" a disclosure by Prof K. K. Sirkar, H. Chen and A. S. Kovvali.
4. "Carbon dioxide separation with novel solvents as liquid membranes" a disclosure by Prof Kamalesh K. Sirkar and A. Sarma Kovvali.

While the invention has been described and illustrated herein by references to the specific embodiments, various specific material, procedures and examples, it is understood that the invention is not restricted to the particular material combinations of material, and procedures selected for that purpose. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

The present invention may be better understood by reference to the following non-limiting examples, which are provided as exemplary of the invention. The following examples are presented in order to more fully illustrate the preferred embodiments of the invention. They should in no way be construed, however, as limiting the broad scope of the invention.

EXAMPLE 1

Methods

The experimental setup is shown in FIG. 1. Absorber and stripper were made of hydrophobic Celgard X-10 polypropylene hollow microporous fibers. The absorber had 40 fibers of length 17.1 cm and had a gas-liquid contact area of 51.5 cm². The stripper had 80 fibers of 17.0 cm length and had a gas-liquid contact area of 102 cm². A 21.66 vol % of an aqueous solution of PAMAM (polyamidoamine) dendrimer of generation zero supplied by Dendritech (Midland, Mich.) was used as the absorbent liquid and was circulated between the absorber and stripper. This absorbing liquid acts as a mobile liquid membrane. A gas mixture of 5% of $CO_2$ in $N_2$ was used as the feed gas and gaseous helium was used to strip the CO from the absorbent liquid. The experiment was started by first passing the aqueous solution of dendrimer through the tube side of the hollow fiber membranes, followed by passing the feed and sweep gases countercurrently on the shell side. The feed and sweep gas flow rates were held constant at 8.74 cc/min and 61.34 cc/min respectively. The absorbent liquid was also allowed to flow at a constant rate of 6.8 cc/min. The experiment was continued for a period of 55 days by maintaining constant flow rates throughout the period and frequent analysis of the extent of $CO_2$ absorption.

Calculation of the Logarithmic Mean Concentration Difference-Based Overall Mass Transfer Coefficients of the Absorber $C_{g,in}$=concentration of $CO_2$ in the feed inlet=5 vol %=$2.0461 \times 10^{-6}$ mol/cc
$C_{g,out}$=concentration of $CO_2$ in the feed outlet=2.55 vol %=$1.0461 \times 10^{-6}$ mol/cc
$V_l$=liquid flow rate=6.8 cc/min
$V_g$=gas flow rate=8.74 cc/min
$A_T$=51.5 cm²
Henry's law constant=H=0.8 moles of $CO_2$ in liquid/moles of $CO_2$ in gas From the material balance, $$= C^t_{l,out} - C^t_{l,in} = \frac{V_g(C_{g,in} - C_{g,out})}{V_l} = [8.74 \times (2.046 \times 10^{-6} - 1.0435 \times 10^{-6})] \div 6.8$$

$$= 1.2886 \times 10^{-6} \text{mol/cc}$$

where $C^t_{l,in}$ and $C^t_{l,out}$ are the total liquid phase $CO_2$ concentrations at the liquid inlet and outlet respectively.

The quantity $(\Delta C)_{lm}$, the logarithmic mean difference of gas species is given by $$(\Delta C)_{lm} = \frac{(HC_{gin} - C^t_{lout}) - (HC_{gout} - C^t_{lin})}{\ln\left(\frac{HC_{gin} - C^t_{lout}}{HC_{gout} - C^t_{lin}}\right)}$$

$$= \frac{(0.8 \times (2.0461 \times 10^{-6}) - 0) - (0.8 \times (1.0435 \times 10^{-6}) - 0)}{\ln\left(\frac{0.8 \times (2.0461 \times 10^{-6}) - 0}{0.8 \times (1.0435 \times 10^{-6}) - 0}\right)} = 1.191 \times 10^{-6} \text{ mol/cc}$$

$C_{l,in}$ and $C_{l,out}$ and are the free $CO_2$ concentrations at the liquid inlet and outlet respectively and they are assumed to be zero in the bulk of the liquid. Logarithmic mean concentration difference-based overall mass transfer coefficient is given by $$K_{OLM} = \frac{V_l(C^t_{lout} - C^t_{lin})}{60 A_T (\Delta C)_{lm}} = \frac{6.8 \times (1.2886 \times 10^{-6})}{60 \times 51.5 \times 1.191 \times 10^{-6}} = 2.38 \times 10^{-3} \text{ cm/sec}$$

Results

Figure 2:
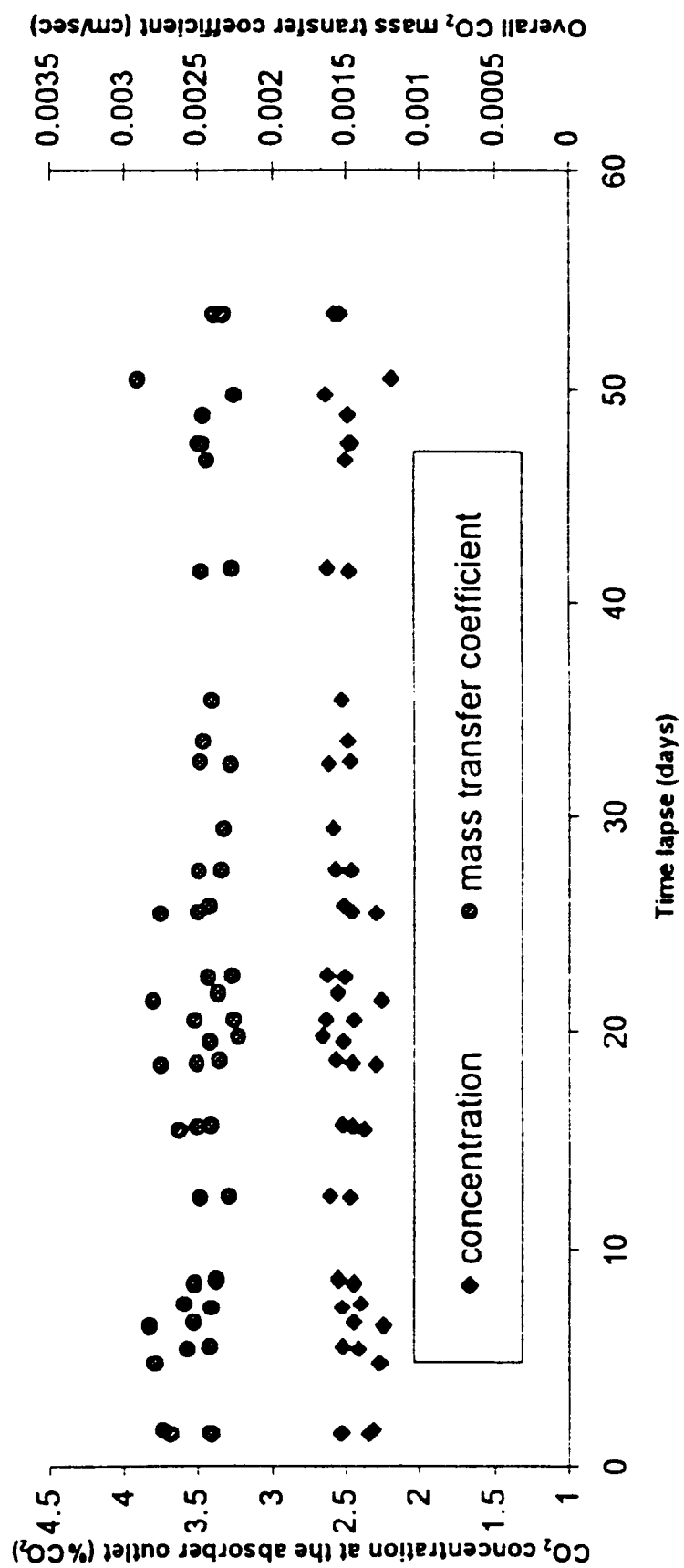
FIG. 2 is a plot of the results of the experiment of Example 1

The results in the FIG. 2 show that the dendrimer solution is quite efficient in removing $CO_2$ and the absorption stripping behavior remained unchanged over a long period of time. Therefore the pores in the Celgard membrane were not wetted at all by the aqueous dendrimer solution, a quite advantageous effect since most aqueous solutions of amines used for $CO_2$ scrubbing e.g. monoethanolamine will wet the pores of Celgard fiber and render it unusable within a few days.

What is claimed is:

1. A method for separating carbon dioxide from a gas mixture including carbon dioxide, comprising contacting an immobilized liquid membrane containing a dendrimer and an optional solvent, said solvent selected from the group consisting of glycerol, polyethylene glycol, water, refrigerated methanol, NMP, glycerol carbonate, and combinations thereof with said gas mixture, whereby at least some quantity of carbon dioxide is separated.

2. The method of claim 1 wherein said immobilized liquid membrane containing said dendrimer comprises a porous hydrophilized poly(vinylidene fluoride) or a polypropylene membrane and said optional solvent is selected from the group consisting of glycerol, polyethylene glycol, water, refrigerated methanol, NMP, glycerol carbonate, and combinations thereof.

3. The method of claim 1 wherein the dendrimer is a generation zero polyamidoamine dendrimer.

4. The method of claim 1 wherein the dendrimer undergoes a reversible chemical reaction with carbon dioxide.

5. A method for separating carbon dioxide from a gas mixture including carbon dioxide, comprising
   in an absorbtion module,
      contacting a mobile liquid membrane containing a dendrimer and an optional solvent, said solvent selected from the group consisting of glycerol, polyethylene glycol, water, refrigerated methanol, NMP, glycerol carbonate, and combinations thereof with said gas mixture
      whereby at least some quantity of carbon dioxide is separated; and in a stripping unit,
      regenerating said dendrimer and optional solvent for subsequent reuse in the absorbing module.

* * * * *